United States Patent [19]
Waterloo

[11] 3,751,014
[45] Aug. 7, 1973

[54] APPARATUS FOR EXTRUDING SYNTHETIC PLASTIC RESINS AT LOW TEMPERATURES

[75] Inventor: William C. Waterloo, York, Pa.

[74] Asignee: Graham Engineering Corporation, York, Pa.

[22] Filed: Sept. 21, 1970

[21] Appl. No.: 73,870

[52] U.S. Cl............... 259/191, 165/30, 259/9, 259/DIG. 18, 425/144
[51] Int. Cl........ B29b 1/06, B29b 3/00, H05b 1/02
[58] Field of Search.............. 259/185, 191, 192, 259/193, 9, 10, DIG. 18; 425/144; 236/15 B, 78 B; 165/30

[56] References Cited
UNITED STATES PATENTS

| | | | |
|---|---|---|---|
| 3,317,958 | 5/1967 | Stroup et al. | 259/191 X |
| 3,143,167 | 8/1964 | Vieth | 236/78 B X |
| 3,625,421 | 12/1971 | Garrison | 236/78 B X |
| 3,315,892 | 4/1967 | Haake | 236/78 B |
| 2,508,988 | 5/1950 | Bradley | 425/144 X |
| 3,447,790 | 6/1969 | Ross et al. | 263/28 |
| 3,431,599 | 3/1969 | Fogelberg | 425/144 X |
| 3,129,459 | 4/1964 | Kullgren et al. | 425/144 X |

Primary Examiner—John Petrakes
Assistant Examiner—Alan I. Cantor
Attorney—C. Hercus Just

[57] ABSTRACT

A method and apparatus for manufacturing synthetic resin extrusion products by controlling the temperature of the resin to within ±10°F. of a desired point as it is formed into a homogeneous mass and extruded. This control is accomplished by providing one temperature sensing thermocouple in the barrel of the extruder, another temperature sensing thermocouple in the heating/cooling jacket mounted on the outside of the barrel, and by providing electrical control circuitry which averages the temperature readings of the two thermocouples and controls the supply of energy to the heating/cooling jacket in accordance with the difference between that average and the desired temperature to which the controller is set. Included as well is the novel synthetic resin extrusion article obtained by extruding the resin upwardly into a tubular parison using this low temperature process and stretching the parison axially before blow molding it.

7 Claims, 6 Drawing Figures

PATENTED AUG 7 1973

INVENTOR.
WILLIAM C. WATERLOO
BY

ATTORNEY

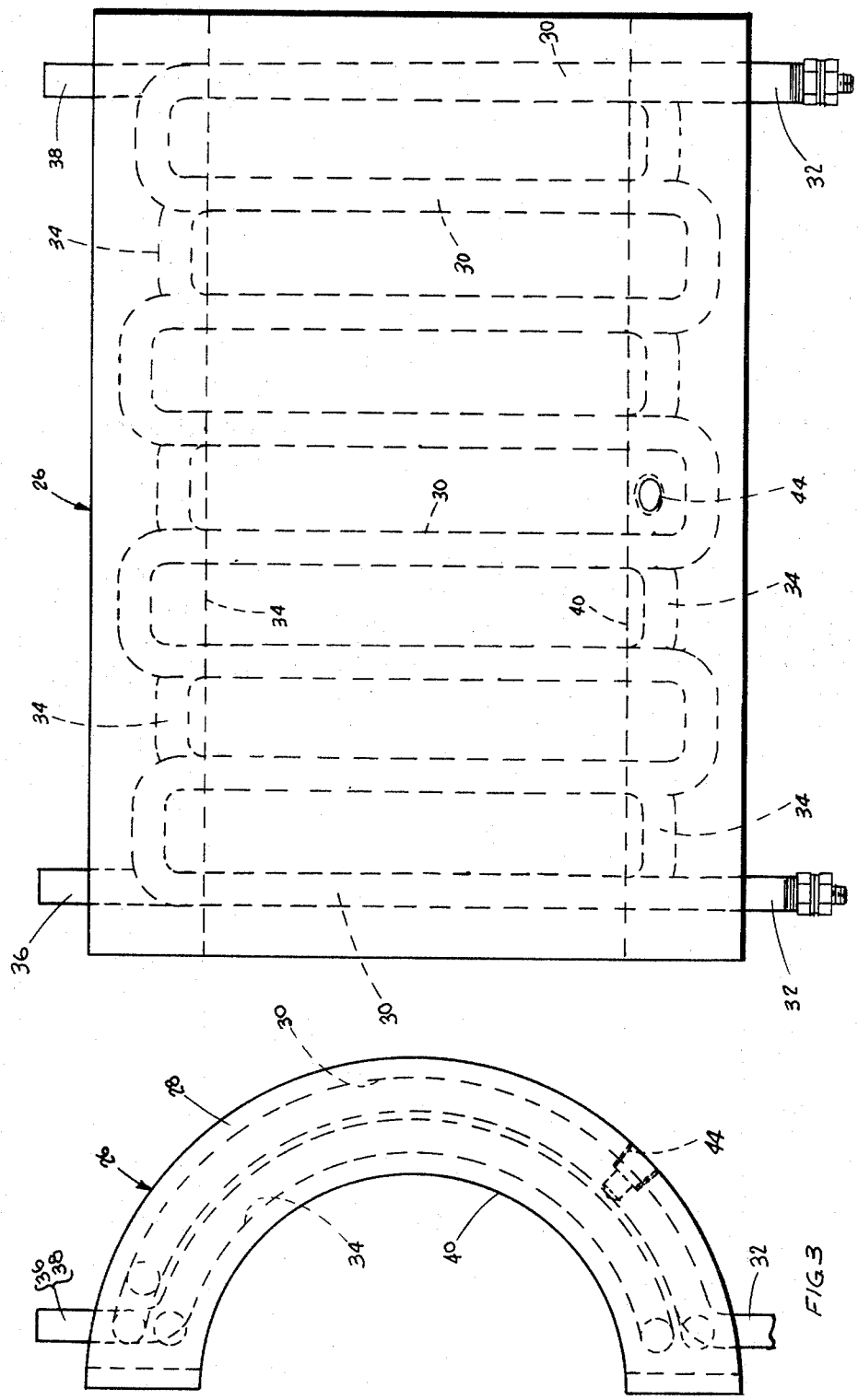

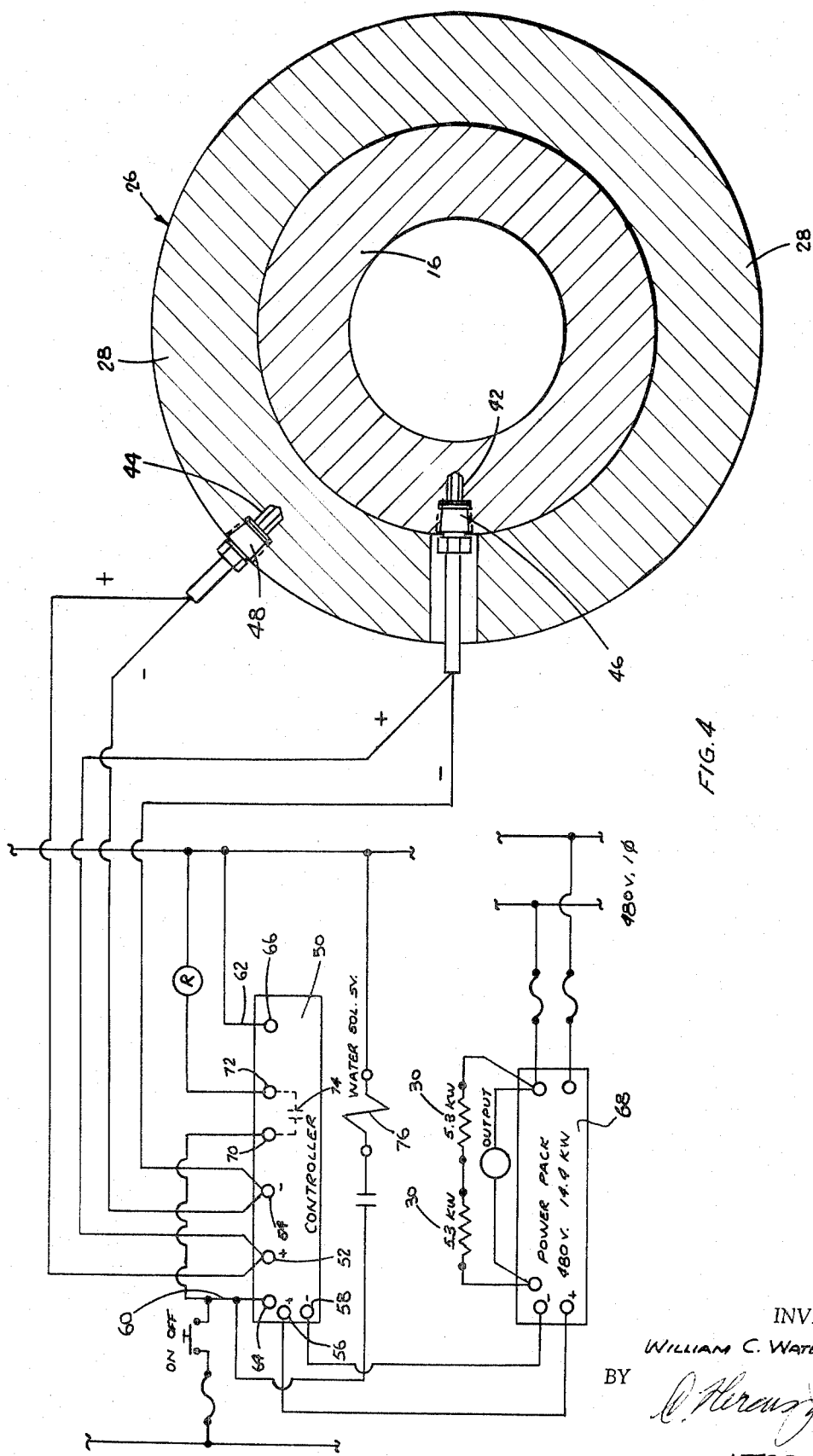

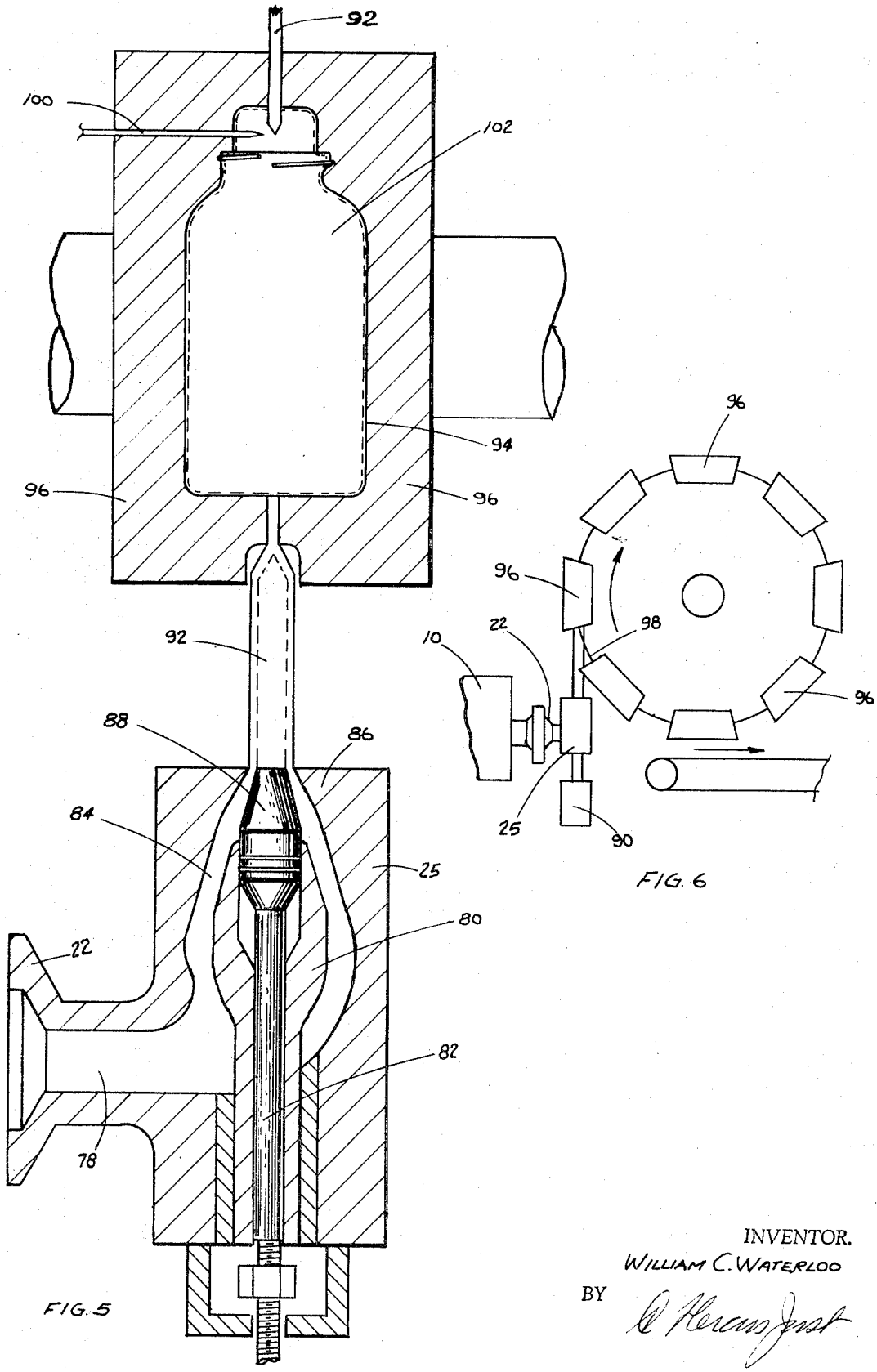

APPARATUS FOR EXTRUDING SYNTHETIC PLASTIC RESINS AT LOW TEMPERATURES

BACKGROUND OF THE INVENTION

This invention relates to the extrusion of synthetic resins and more particularly to a novel method and apparatus for extruding such resins under closely controlled temperature conditions. It also concerns a novel extrusion product made by this controlled temperature process.

Heretofore, extrusion has been widely used in the plastics industry for continuously melting, blending, forming and solidifying plastics into a desired shape. Extruders are often used, for example, in blow molding operations to form tubular parisons which are then blown in a mold to form the desired shape. A typical extruder includes a rotating screw enclosed in a cylindrical barrel and a heating/cooling system (i.e., heat energy transfer system) in several zones surrounding the barrel. When properly combined these elements produce a fully plasticated thermally homogeneous melt which is forced i.e., extruded through a die.

It is known to provide the barrel with heating/cooling systems of cast aluminum which contain electrical resistance elements to supply heat and which also contain embedded tubes to carry cooling water to remove the excess heat from the barrel.

The heating is required to bring the resin up to its melting temperature; the cooling is needed to carry away excess heat which arises from any source and particularly that which comes from the mechanical working of the resin by the screw.

All temperature control methods and systems have to cope with the fact that in any plastics extrusion apparatus the barrel through which the resin passes and the heating/cooling devices which are affixed to it act as heat sinks and absorb or give off a certain amount of heat before rising or falling in temperature. Thus there is a delay between the time heating or cooling is begun and the time the desired temperature reaches the resin inside of the barrel.

In prior systems this lag in bringing the barrel to the desired temperature has resulted in barrel temperatures which swing over relatively large ranges, for example, from about 25°-50°F. about a desired point. This has meant that to ensure that some of the resin doesn't get below its melting point the swings of the barrel temperature have had to be kept further above the melting point of the resin than is desirable. Keeping the resin that hot, however, increases the risk of burning it particularly when the extruder is shut down overnight and among other things makes the manufacturing of products from the melt more difficult because they have to be cooled down further to become solidified.

It is therefore one object of the invention to provide an improved method and apparatus for controlling the temperature of the resin to within a narrow range about a set point as it is being plasticated and extruded.

Another object is to provide an improved synthetic extrusion product by this novel method.

A further object is to provide a method and apparatus for producing blow molded products more efficiently in less time and using less resin.

Still another object is to provide a novel method and apparatus which will control the temperature of the resin to within a range of about ± 10°F. with respect to a desired set point while it is being plasticated and extruded.

Further, other and additional objects of the invention will become apparent from the Summary, Detailed Description, Claims and drawings which follow hereinafter.

BRIEF SUMMARY OF THE INVENTION

In one aspect the invention comprises a method of controlling the temperature of synthetic plastic resins about a set point as they are worked into a thermally homogeneous melt and then extruded, comprising the steps of sensing the temperature within the extruder at two different radial distances from the axis of the resin passage through the extruder and controlling the exchange of heat with the extruder barrel in accordance with both temperatures. More specifically the method includes sensing the temperature of the extruder barrel in a well on its periphery at one radial distance from a point on the axis of the resin passage through the barrel, sensing the temperature in a heat exchange device mounted on the barrel at a greater radial distance from that point and controlling the amount of heat exchanged between the barrel and the device according to the difference between the average of the two temperatures being sensed and a desired temperature (i.e., set point). This technique has several advantages, one of which is that it enables the heating and cooling of the extruder barrel to begin before the thermocouple in the barrel indicates a change is needed. The change is called for just early enough in the cycle to bring the heat exchange unit and the barrel to the required temperature level about the time that heat needs to be exchanged. This enables the resin to be kept within about ± 2°-5°F. of a desired set point and thus closer to the melting point of the resin than heretofore possible.

In another aspect the invention includes apparatus for controlling the temperature of synthetic plastic resins about a set point as they are worked into a thermally homogeneous melt in an extruder comprising a temperature sensing device mounted on the barrel of the extruder, a second temperature sensing device mounted on a heat exchange unit in good thermal contact with the exterior of the barrel and means including control circuitry for adding or subtracting heat to and from the unit according to the signals received from these devices. The temperature sensing devices are preferably thermocouples, mounted in wells in the barrel and the heat exchange units.

In a further aspect the invention includes the synthetic resin article which is produced using the method of this invention. More specifically it comprises the blow molded container or other product which is produced from a blown-in-the-mold parison tube extruded in accordance with the inventive method. Such containers are greatly improved over blow molded products made from extruded parisons whose temperature is not kept close to the fusing temperature of the material. For example, blow molded high density polyethylene containers made from the low temperature parison extruded in accordance with the method of this invention have a greater impact strength than products from a similar parison extruded at higher temperatures. In addition, when the resin used is clear, extruding the parison according to this method improves the clarity of the blow molded product. Also, it enables the products to be made faster because less cooling is required to solidify the melt.

Further, other and additional aspects and advantages of the invention will become apparent from the description and claims which follow hereinafter.

DESCRIPTION OF THE DRAWINGS

FIG. 2 is a larger scale vertical elevation view of one section of a heat exchange unit for the barrel of the extruder of FIG. 1 showing the heating and cooling features of the unit.

FIG. 3 is a left profile view of the temperature-supplying unit shown in FIG. 2.

FIG. 4 is a large scale cross sectional view of the barrel section of the preferred embodiment taken on line 1—1 of FIG. 1, but illustrated on a larger scale than employed in that figure, illustrating diagrammatically a preferred temperature control means for the heat exchange unit of FIGS. 2 and 3.

FIG. 5 is a vertical sectional view of a parison extruder head and a blow-molding mold clamped about the extruded parison in accordance with the invention.

FIG. 6 is a small scale diagrammatic side elevation view of the parison extruder head and Ferris wheel on which the molds are mounted illustrating the relative positions of these elements in accordance with the invention.

DETAILED DESCRIPTION

Figure 1:
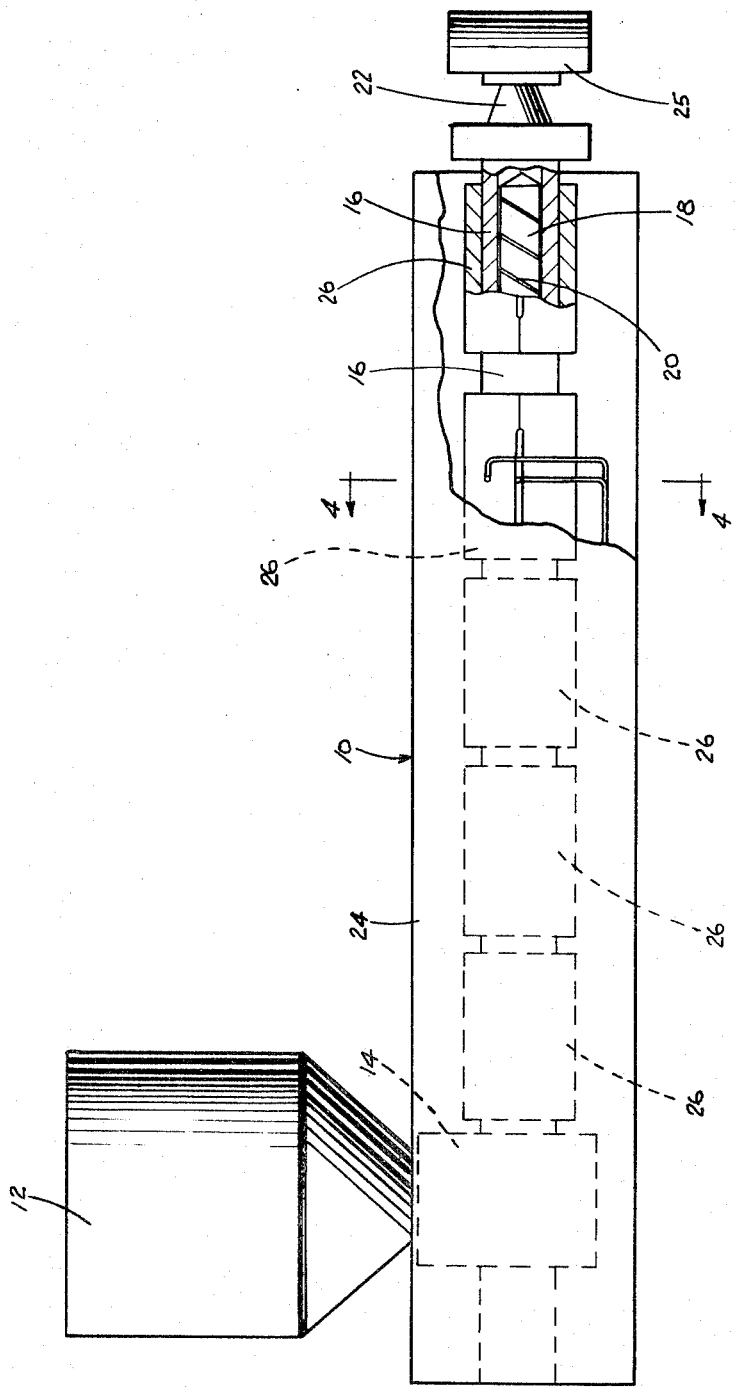
FIG. 1 is a vertical elevation view of a preferred embodiment of an extruder apparatus according to the invention partly broken away.

Referring now to FIG. 1, a preferred embodiment of the apparatus according to the invention includes an extruder 10 and a supply hopper 12 positioned at one end adjacent the inlet 14 by which granular or powdered thermoplastic synthetic resin is delivered to the entrance of the horizontal barrel 16 of the extruder 10. A screw 18 for plasticating the resin and advancing it through the barrel is mounted within the bore of the barrel 16.

The end of the screw 18 adjacent the inlet 14 of the system is connected to suitable drive means, not shown, for rotating the screw 18 at a desired rate and in a direction to cause the spiral flights 20 on the screw to work and plasticate the resin and propel it toward the discharge end 22 of the barrel 16. The barrel 16 is suitably supported in a stationary manner within a housing 24 of suitable shape and construction. The discharge end of the barrel delivers fused or melted resin to an extruder head 25.

To control the temperature of the resin in the barrel, a plurality of heat exchange units 26 are mounted one after the other next to each other around and along the length of the barrel 16. Each of these units is constructed to furnish heat or cooling media to the barrel for the purpose of exchanging heat with the barrel in a specified area along its length to insure control of the temperature of the resin in that area within a narrow range about a desired set point. The heat exchanged with the barrel is very carefully and precisely controlled by means described hereinafter so that, under preferred conditions of operation, the resin does not vary more than 5°F. or at the most 10°F. above or below a desired set point in each controlled zone.

The temperature-supplying units 26, comprise semi-cylindrical castings 28 (see FIG. 3) which are made of high thermal conductivity metal, such as for example, certain aluminum alloys, which are highly suitable materials for forming castings 28. Each casting also preferably is provided with heating means as well as cooling means. The heating means (see FIGS. 2 and 3) comprise a sinuous coil 30 of electrical resistance means of suitable capacity. One type of electrical resistance means available for such purposes is sold under the tradename "Calrod". The coil is provided at opposite ends with terminals 32 by which it is electrically connected to a controlled source of electricity. Details of the control for this source means 50 are described hereinafter.

The castings 28 also are each provided with a sinuous arrangement of a unitary conduit 34 which has an inlet end 36 and an outlet end 38. In each casting the end 36 and end 38 respectively are connected to supply conduits, not shown, carrying liquid coolant. Conduit 34 lies adjacent the radially inner surface of casting 28 and in this way keeps the cooling medium closer to the barrel than the electrical coil 30 which is near the radially outer surface of the casting. Preferably, distilled water from a closed system is used as the liquid coolant in order to maintain minimum corrosion or deposit upon the inner walls of the sinuous conduit 34. The use of water as a coolant also has the advantage that if enough heat is added it will cool by boiling without rising in temperature thus utilizing the heat of vaporization of the coolant to cool effect by absorbing heat from the casting 28. In such a closed system, details of which are not illustrated, a suitable condenser or heat exchanger, not shown, may be employed to condense any of the fluid which has been vaporized and also reduce the temperature of the condensed fluid for reuse as a coolant.

The two semi-cylindrical castings of each of the units 26 are mounted on the barrel by conventional means. The inner surface 40 of each of the castings is shaped to closely complement the exterior surface of the barrel 16 and is in good thermal contact with this surface for efficient passage of heat by conduction between the heat exchange units 26 and the barrel 16.

Each of these units 26 has a temperature control system associated with it which controls the addition and subtraction of heat to and from the barrel and maintains the temperature of the resin with a very narrow range. For example, using high density polyethylene, the melting temperature of which is between 330°–420°F., the apparatus of the invention is adapted to bring the resin to a temperature of 380°F. and to keep it very close to that temperature during plastication and extrusion. Other resins may be worked and extruded at different temperatures.

Referring now to FIG. 4, between the ends of each of the portions of the barrel 16 enclosed by units 26, the barrel is provided with a short radially inwardly extending well 42 of limited diameter. The depth of the well is preferably about half the thickness of the wall of the barrel 16. One of the two castings 28 in each heat exchange unit 26 also is similarly provided with a radially inwardly extending well 44 also of similar diameter and depth, the depth preferably being approximately half the thickness of the casting 28.

In these radial wells 42 and 44 are mounted temperature-sensing elements 46 and 48. The preferred type of such element is a thermocouple of appropriate rating and capacity. The electrical leads from each thermocouple are connected to the controller 50 with the leads from the positive side of the thermocouples 46 and 48 connected to a positive terminal 52 on controller 50 and the leads from the negative side to a negative terminal 54. The controller is a commercially available device and is provided with a null balancing circuit, not shown, which automatically averages the temperatures indicated individually by the temperature-sensing elements 46 and 48. The device also compares the resulting average with a predetermined temperature or set point which is set into the controller 50 by adjusting a variable potentiometer in the null balance circuit. It generates a signal of one sign to add heat to the unit 26 if the circuit is off balance in one direction and a signal of opposite sign to add cooling if it is off balance in the opposite direction. When the circuit is in balance it puts out no signal and neither heat nor cooling is added to the unit.

Each heat exchange unit 26 has its own controller 50 and adds or subtracts heat to or from the barrel automatically in response to a signal from its controller 50. At any given time depending on a comparison of the average temperature reading with its set point some of the units 26 may be adding heat, some may be doing nothing, and some may be subtracting heat. Each unit is controlled completely independently of the others. When a decrease in temperature is required at one location the controller 50 associated with the heat exchange unit in that area operates a solenoid valve 76 to begin the flow of cooling water through the unit 26. Cooling is stopped when the controller operates the valve 76 in the other direction to shut the water flow off. When heat is required electrical energy is fed to the heaters 30 and is shut off again when a balance is regained. One advantage of the method and apparatus according to the invention is that all of the heat exchange units including the one in the extruder head are temperature controlled so closely that the temperature never varies more than ± 10°F. around its set point. In fact, the apparatus according to the invention is adapted to keep the average temperature indications of the two thermocouples associated with each controller to within about ± 5°F. of the temperature point to which that controller is set. Because of this accurate control of the resin temperature the resin is worked out and extruded at a lower temperature with the resulting benefit that the quality of the final product is improved and the time needed to cool it is lessened. This reduction in required cooling time is important because it can and often does comprise a majority of the total time required to make, for example, a blow molded product. In addition, by controlling the temperature so closely the chances of "burning" the resin and otherwise preventing impairment of the visual and/or physical properties of products molded from the fused resin are improved. This advantage is particularly significant in shutting down the extruder overnight because the temperature control system of the invention often permits the extruder to be shut down with the resin in it without burning the resin.

The controller 50 is electrically connected via its terminals 56 and 58 to a conventional power pack 68 which uses silicon controlled rectifiers (SCR's) to control the amount of power fed to the load in accordance with electrical signals from the controller. The size and sign of the signal from the controller determines how much power the pack 68 delivers to the coils 30 which are electrically connected to the power pack. Terminals 70 and 72 of controller 50 serve to trigger an alarm circuit including an alarm 74, if the temperatures sensed get too far away from the desired set point. The controller itself gets power from conductors 60, 62 connected to a conventional 110 volt AC source through terminals 64, 66.

In the preferred apparatus according to the invention there are six heat exchange devices, five of which are clamped around the barrel 16 in closely spaced relationship along its length. Of these five the one closest to the inlet 14 surrounds the feed zone and normally adds heat during the operation of the extruder in order to bring the resin up to the desired temperature. The next two toward the discharge end of the barrel 22 surround the compression zone of the barrel and during normal operation of the extruder neither add nor subtract much heat. Thus they operate in a relatively steady state condition. The final two of these five heat exchange units lie in the metering zone closest to the discharge end of the barrel and normally remove the excess heat generated by mechanical working of the resin by the screw 18. The temperatures to which the controllers 50 are set for each of the heat exchange units in these three zones, are preferably different with the highest temperature set point being at the discharge end 22 of the barrel and the lowest at the inlet end 14.

In addition, there is a heater (not shown) and a controller 50 associated with the extruder head 25. This heater is an electrical resistance device also controlled by a null balance circuit as are the others. Since the extruder head 25 contains no cooling coils, however, the circuit only feeds power to the heater when off balance in one direction. Nothing happens when it is off balance in the other. Normally since the resin is not worked to any significant degree in the extruder head cooling is not necessary. This sixth and last controller 50 normally has no averaging function since there is only one thermocouple in the extruder head.

In blow molding tubular parisons extruded in accordance with the method of the invention the temperature of the resin is extruded at a temperature sufficiently above its fusing point that when separated into streams to flow around the mandrel it is warm enough to become fused again without a weld seam within the extruder head 25, exemplary details of which are shown in FIG. 5. The melted resin enters head 25 through an inlet 78 and passes around the mandrel 80 which encloses a hollow die pin stem 82. The position of the mandrel 80 is adjustable along its lengthwise axis relative to the walls of the cavity 84. Its position in the cavity controls the volume of resin delivered to the discharge end 86 of the head 25 in a given length of time. The outer end of the stem 82 comprises a hollow die pin 88 which is movable longitudinally relative to the discharge orifice 86 of the head 25. Movement of the die pin 88 is preferably controlled by a programming control unit 90, diagrammatically shown in FIG. 6, to vary the cross sectional thickness of the parison 92 in accordance with the configuration of the (see FIG. 5) product to be blown.

When blow molding a product using the method according to the invention the parison 92 is extruded upwardly from the head 25 and introduced into a cavity 94 defined by two transversely movable mating mold half sections 96. These mold sections are mounted on a rotatable Ferris wheel 98, which rotates clockwise as shown by the directional arrow in FIG. 6 and includes means whereby the mold halves are clamped around the parison tightly pinching it at the top and bottom of both halves. As the wheel rotates the clamped mold halves move upwardly and away from the extruder head 25 and pull the parison upwardly. By setting the peripheral speed of the wheel and thus that of the mold sections at a level which is slightly higher than the speed with which the parison is continuously extruded. The parison is stretched lengthwise by one mold before the succeeding mold is clamped around it. This stretching orients the molecules of the resin axially with respect to the parison and to the mold which clamps about it and improves the characteristics of the blown product as described more fully hereinafter.

When the mold sections 96 are clamped around the parison 92 it closes off the ends of the parison within the mold. Then a blowing needle 100 actuated by a conventional mechanism, not shown, is driven into a wall portion at the upper end of the parison (see FIG. 5) and air is blown through the needle into the parison to inflate it until its walls come in firm contact with the walls of the mold sections 96 defining the mold cavity 94. Cooling fluid passing through these mold sections solidifies the product thus formed and when sufficient cooling has been accomplished the mold halves are separated again and the blown product removed.

In this process the variations in the wall thickness of the parison are controlled in a timed relation to the presentation of the mold sections to the parison so that when the parison is clamped by the mold sections the portion of the parison which may form, for example, a neck of the blown product, has one wall thickness and the body of the product, which often is blown up to a much greater degree than the neck, another thickness.

The blowing air which is introduced into the hollow molded object 102 will also facilitate the cooling of the molded product and if desired, may be refrigerated. As a result of the blowing of the parison to expand it circumferentially, the resin of the resulting product is given a molecular orientation in the transverse direction. This is, of course, combined with the molecular orientation of the resin in the lengthwise direction accomplished by stretching the parison, as described above, with the result that the resin in the product is bi-axially oriented. This greatly increases the tensile and compressive strength of the product and thereby results in permitting the production of hollow products having thinner wall sections without a loss in strength. In this way the process is more economical since less resin is required for each product.

From the foregoing, it will be seen that the present invention produces a superior product which not only has a greater impact strength due to being extruded at a lower temperature than has heretofore been possible, but when blow molded also has a greater tensile and compressive strength for a given wall thickness than products made on conventional blow molding equipment, due among other reasons to the bi-axial orientation of the molecules of the resin.

To prevent collapsing and possible cohesion of the parison walls when the mold sections close upon it and pull it away from the parison head, air, known as parison air, is introduced through the hollow core of the die pin 88 under sufficient pressure to keep the walls apart. If desired, temperature of the air introduced into the hollow parison may be kept low to aid in cooling the parison.

While the invention has been described and illustrated in its several preferred embodiments, it should be understood that the invention is not to be limited to the precise details herein illustrated and described since the same may be carried out in other ways falling within the scope of the invention as illustrated and described.

What is claimed is:

1. Apparatus for extruding synthetic resin comprising in combination, a barrel having resin inlet and discharge means respectively adjacent opposite ends thereof, resin propelling screw means within said barrel for mechanically working and plasticating said resin, heat exchange units mounted on the outside of the barrel and connectable to sources of heating and cooling media to control the temperature of resin therein and operable selectively to heat and cool the same, means comprising a signal generating temperature-sensing device extending into the barrel a predetermined radial distance from its axis to sense the temperature of the resin within the barrel, a second signal generating temperature-sensing device mounted upon the said heat exchange units and operable to sense the temperature thereof, and means including control circuitry connected to both said temperature-sensing devices and operable to average the indications thereof relative to a desired set point of temperature and control the delivery of heat or cooling to said heat exchange units for transfer of the effect thereof to said barrel as required to produce a desired temperature in the resin discharged from said barrel in accordance with the signals generated by said devices.

2. Apparatus according to claim 1 wherein the heat exchange device includes both heating means and cooling means and the means including control circuitry includes means for energizing the heating means whenever the indicated temperature average is below the set point by a predetermined amount and for energizing the cooling means whenever this average is above the set point by a predetermined amount.

3. Apparatus according to claim 2 wherein there is a well in the radial periphery of the barrel and the first temperature sensing device comprises a thermocouple mounted in the well, the heat exchange device is mounted on the barrel, there is a well in the periphery of the heat exchange device and the second temperature sensing device comprises a thermocouple mounted therein and said control circuitry includes a null balance circuit.

4. Apparatus according to claim 3 wherein each of the thermocouples lie at different radial distances in a single plane through and perpendicular to the barrel.

5. Apparatus according to claim 4 wherein the control circuitry is voltage regulating circuitry whereby the amount of energy fed to the heating means increases as the difference between the average indicated temperature and the set point becomes greater.

6. Apparatus according to claim 1 wherein the heat exchange units include heating means and the means including control circuitry includes means for energizing the heating means whenever said average is lower than a predetermined level.

7. Apparatus according to claim 1 wherein the heat exchange units include cooling means and the means including control circuitry includes means for energizing the cooling means whenever said average is higher than a predetermined level.

* * * * *